United States Patent
Greiner

(10) Patent No.: US 9,648,852 B2
(45) Date of Patent: May 16, 2017

(54) SYSTEM AND METHOD OF PET BEHAVIOR MODIFICATION

(75) Inventor: Angela Greiner, Plano, TX (US)

(73) Assignee: Angela Lynn Greiner, Plano, TX (US)

(*) Notice: Subject to any disclaimer, the term of this patent is extended or adjusted under 35 U.S.C. 154(b) by 1050 days.

(21) Appl. No.: 12/872,186

(22) Filed: Aug. 31, 2010

(65) Prior Publication Data

US 2011/0047883 A1 Mar. 3, 2011

Related U.S. Application Data

(60) Provisional application No. 61/238,827, filed on Sep. 1, 2009.

(51) Int. Cl.
| | | |
|---|---|---|
| *A01K 15/00* | (2006.01) | |
| *E06B 3/30* | (2006.01) | |
| *A01K 15/02* | (2006.01) | |
| *A01K 1/035* | (2006.01) | |
| *A01M 29/12* | (2011.01) | |
| *E06B 3/70* | (2006.01) | |

(52) U.S. Cl.
CPC ............ *A01K 15/02* (2013.01); *A01K 1/035* (2013.01); *A01M 29/12* (2013.01); *E06B 3/7001* (2013.01)

(58) Field of Classification Search
USPC ........ 49/58, 59, 70; 119/501, 706, 712, 821, 119/860
See application file for complete search history.

(56) References Cited

U.S. PATENT DOCUMENTS

| | | | | |
|---|---|---|---|---|
| 3,663,253 A | * | 5/1972 | Stone | 106/15.05 |
| 3,916,838 A | * | 11/1975 | Swart | 49/460 |
| 4,171,463 A | * | 10/1979 | Watkins | 174/120 R |
| 4,539,936 A | * | 9/1985 | Majewski | 49/460 |
| 4,804,142 A | * | 2/1989 | Riley | 239/56 |
| 5,103,593 A | * | 4/1992 | McNaughton | 49/460 |
| 5,364,626 A | * | 11/1994 | Hasegawa et al. | 424/403 |
| 5,379,552 A | | 1/1995 | Smith | |
| 5,741,553 A | * | 4/1998 | Manolas et al. | 119/712 |
| 6,095,091 A | | 8/2000 | Byrne | |
| 6,460,487 B1 | | 10/2002 | Betzen | |
| 6,468,554 B1 | * | 10/2002 | Ichino | 424/406 |
| 7,159,257 B1 | * | 1/2007 | Struthers | 5/487 |

(Continued)

FOREIGN PATENT DOCUMENTS

EP 1797756 6/2007

*Primary Examiner* — Justin Rephann
(74) *Attorney, Agent, or Firm* — Elizabeth Philip Dahm; Kelly J. Kubasta; Ferguson Braswell Fraser Kubasta PC

(57) ABSTRACT

A system (100) and method (900) of training or modifying the behavior of pets and, in particular, dogs is disclosed and could include using scratch-resistant protector (104, 200, 300, 400, 500, 600, 700, 800) having adhesive (202, 402, 602, 802), additive (302, 404, 502, 604, 702, 704, 804, 806), or both to protect the integrity of door (102). Adhesive (202, 402, 602, 802) could generally provide a securing or coupling relationship between door (102) and protector (104, 200, 300, 400, 500, 600, 700, 800), while additive (302, 404, 502, 604, 702, 704, 804, 806) could provide a material that canines find unpleasant to smell, taste, touch, or scratch. In one embodiment, additive (302, 404, 502, 604, 702, 704, 804, 806) could include an additive that may be reapplied if it wears off or otherwise diminishes in strength, quantity, quality, or overall effectiveness.

16 Claims, 3 Drawing Sheets

(56) References Cited

U.S. PATENT DOCUMENTS

| | | |
|---|---|---|
| 7,287,489 B1* | 10/2007 | O'Brien ................... 119/712 |
| 2003/0064099 A1* | 4/2003 | Oshlack et al. ............ 424/465 |
| 2004/0123933 A1* | 7/2004 | Pemberton et al. ........... 156/71 |
| 2004/0126324 A1* | 7/2004 | Hughes ..................... 424/10.1 |
| 2005/0214351 A1* | 9/2005 | Chew ....................... 424/445 |
| 2005/0227032 A1* | 10/2005 | Pemberton ................. 428/40.1 |
| 2007/0017158 A1* | 1/2007 | Larkin et al. ................. 49/460 |
| 2008/0190381 A1 | 8/2008 | Stampe |
| 2008/0295782 A1* | 12/2008 | Ebert ........................ 119/706 |
| 2009/0283054 A1* | 11/2009 | Reyes ........................ 119/708 |
| 2011/0290198 A1* | 12/2011 | Pemberton ................. 119/712 |
| 2012/0152182 A1* | 6/2012 | Vickery ..................... 119/850 |

\* cited by examiner

SYSTEM AND METHOD OF PET BEHAVIOR MODIFICATION

This application claims priority and the benefit under U.S.C. §119(e) from U.S. provisional patent application 60/238,827 for "System and Method of Pet Behavior Modification" filed Sep. 1, 2009, which is hereby incorporated by reference.

BACKGROUND

The present disclosure relates generally to a training system and method and, in particular, to a system and method of pet behavior modification.

Pets, in particular dogs, tend to require training and behavior modification for a variety of reasons. For example, dogs are often kept indoors and require house training. Pet owners could use various disciplinary techniques to train pets such as, for example, confining the pet in a particular room or bathroom for a short period of time. When confined in a room, dogs tend to scratch and damage doors and other enclosures in an attempt to escape or get the owner's attention. Repairs to such doors and enclosures could be relatively expensive and bothersome especially if the repairs need to be made often.

What is needed is a system and method of training or modifying the behavior of pets to generally protect the integrity of doors and enclosures.

SUMMARY

Embodiments of the present disclosure generally provide a system and method of pet behavior modification.

In one embodiment, the present disclosure could generally provide a pet behavior modification system. The system could include a covering having an adhesive to couple the covering to a surface. The system could also include an additive associated with the covering. The additive could have a deterrent effect on the pet.

In one embodiment, the present disclosure could generally provide a pet behavior modification system. The system could include a covering having an adhesive to removably couple the covering to a surface of a door. The system could also include an additive associated with the covering and having a deterrent effect to a pet, wherein the deterrent effect is activated when the covering is touched by the pet.

In one embodiment, the present disclosure could include a pet behavior modification system. The system could include a covering having an adhesive to couple the covering to a surface of a door. The system could also include an additive associated with the covering. The additive could release an unpleasant scent when the covering is touched by the pet.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides a system and method of training or modifying the behavior of pets and, in particular, dogs. One embodiment of the present disclosure could include using a scratch-resistant door protector having an adhesive, additive, or both to protect the integrity of the door. The adhesive could generally provide a securing or coupling relationship between the door and the protector, while the additive could provide a material that canines find unpleasant to smell, taste, touch, or scratch. In one embodiment, the additive could be reapplied if the additive wears off or otherwise diminishes in strength, quantity, quality, or overall effectiveness.

Figure 1:
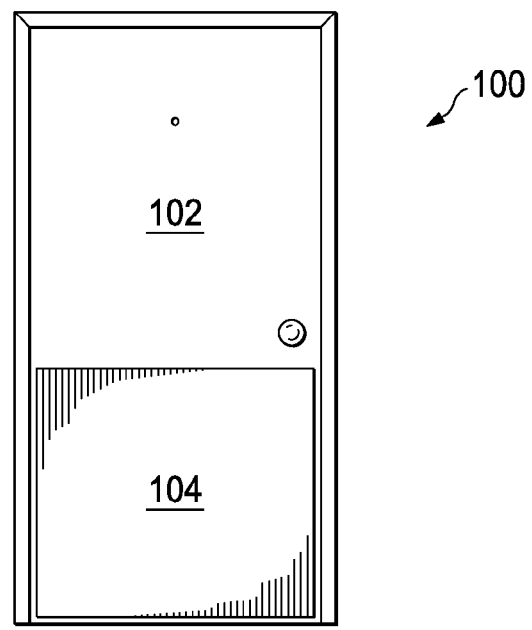
FIG. 1 is an exemplary illustration of a system for canine behavior modification having a door protector according to one embodiment of the present disclosure.

FIG. 1 is an exemplary illustration of a pet or canine behavior modification system 100 according to one embodiment of the present disclosure. It should be understood that system 100 shown in FIG. 1 is for illustrative purposes only and that any other suitable system or subsystem could be used in conjunction with or in lieu of system 100 according to one embodiment of the present disclosure.

System 100 could include door 102 and protector 104 according to one embodiment of the present disclosure. Door 102 could include a track operated door, a trackless door, an overhead door, a sectional door, a rolling door, a roll-up door, a swing door, a panel door, a retractable door, a collapsible door, a canopy-like door, a ball-bearing door, a sliding door, a magnetic door, a push-pull door, a rack and pin controlled door, a remote controlled door, a car door, a car seat, a wall, a drywall, a movable wall, a movable window, a movable panel, a piece of furniture, a floor, a window sill, a ledge, a countertop, a table top, a curtain, a divider, a controllable opening, a configurable aperture, other door-like apparatus, or any suitable combination thereof.

In FIG. 1, door 102 is shown in a generally fully closed position. Door 102 could, however, be moved or otherwise repositioned to a fully opened, semi-open, semi-closed, fully closed, locked, secured, other position or disposition, or any suitable combination thereof to allow the pet to use door 102 to enter or exit through door 102. Although door 102 is generally illustrated as a rectangular shaped structure in FIG. 1, it should be understood that any suitable shape, size, thickness, material, or configuration for door 102 could be used in accordance with the present disclosure.

In one embodiment, door protector 104 could generally be secured or otherwise coupled to door 102 and provide door 102 protection from scratches, marks, or other forms of disfigurement caused by pets and, in particular, canines. Door protector 104 could be secured or otherwise coupled with any suitable surface of door 102 including, for example, a surface that includes glass, wood, metal, plastic, any suitable material, or any combination thereof. In addition, door protector 104 could be secured or otherwise coupled to a smooth, grooved, beveled, painted, coated, sealed, or treated surface of door 102 according to one embodiment of the present disclosure.

In one embodiment, door protector 104 could include nylon, polyurethane, polyethylene, polyvinyl chloride (PVC), polytetrafluoroethylene (PTFE), polyester, high-gloss polyester, laminate, synthetic rubber, natural rubber, plastic, plexiglass, polymer, other suitable materials, or any combination thereof.

Door protector 104 could include any number of suitable coatings, layers, or additives to an entire surface, layer, sub-layer, or structure of door protector 104 or to a portion of a surface, layer, sub-layer, or structure of door protector 104 according to one embodiment of the present disclosure as shown in, for example, FIGS. 2-8 described in detail later herein.

In one embodiment, door protector 104 could be made of a clear material, a colored material, or any desired material to enhance or otherwise suit the décor of door 102 or the room (or other enclosure or area) associated with door 102. If desired, door protector 104 could be embellished with different colors, stickers, removable stickers, paints, stencils, erasable markers, chalks, designs, patterns, images, wood grain patterns, novelty items, ornamental items, other decorative materials, or any combination thereof. In one embodiment, these embellishments could deter the pet from approaching, touching, or scratching door 102.

Door protector 104 could be cut, reconfigured, or otherwise resized to custom fit door 102 or portions of door 102 according to one embodiment of the present disclosure. For example, door protector 104 could be customized to any suitable shape, size, thickness, or configuration in accordance with the present disclosure. In one embodiment, door protector 104 could be placed over a lower portion of a surface of door 102 as shown in FIG. 1. It should be understood, however, that door protector 104 could cover any suitable portion of door 102, two or more surfaces of door 102, two or more portions of door 102, or an entire surface of door 102.

Figure 2:
FIG. 2 is an exemplary cross-sectional view of a door protector having an adhesive layer according to one embodiment of the present disclosure.

FIG. 2 is an exemplary cross-sectional view of door protector 200 having adhesive 202 according to one embodiment of the present disclosure. It should be understood that door protector 200 shown in FIG. 2 is for illustrative purposes only and that any other suitable system or subsystem could be used in conjunction with or in lieu of door protector 200 according to one embodiment of the present disclosure.

Door protector 200 shown in FIG. 2 could be similar to door protector 104 shown in FIG. 1 and described in conjunction with the description accompanying FIG. 1 herein. It should be understood that door protector 200 could also be customized to any suitable shape, size, thickness, or configuration and include any embellishments as describe above with door protector 104 in accordance with the present disclosure.

Adhesive 202 could be disposed on or otherwise coupled to door protector 200 according to one embodiment of the present disclosure. Adhesive 202 could be a layer, part of a layer, sub-layer, strip, a discrete portion of door protector 200, or entire thickness of door protector 200 to generally aid in securing door protector 200 to a door such as, for example, door 102 shown in FIG. 1. Adhesive 202 could include a material conducive to providing a static cling property between door protector 200 and door 102 according to one embodiment of the present disclosure. Adhesive 202 could also include tape, glue, temporary adhesive, hook-and-loop fastener, removable adhesive tab, peel-and-stick materials, spray adhesive, heat sensitive adhesive, clay, putty, sticky material, staples, retaining structures, clips, screws, pins, other suitable adhesive or retaining devices, or any combination thereof.

Figure 3:
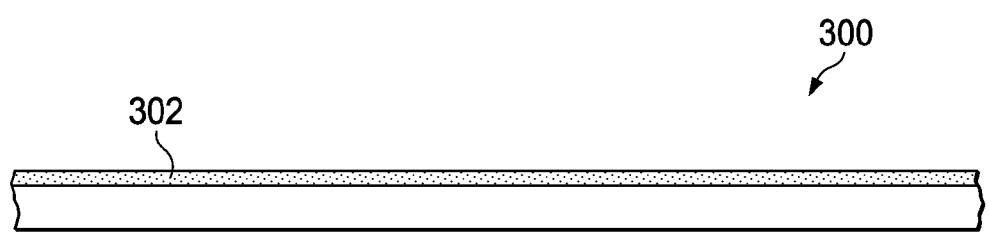
FIG. 3 is an exemplary cross-sectional view of a door protector having an additive according to one embodiment of the present disclosure.

FIG. 3 is an exemplary cross-sectional view of door protector 300 having additive 302 according to one embodiment of the present disclosure. It should be understood that door protector 300 shown in FIG. 3 is for illustrative purposes only and that any other suitable system or subsystem could be used in conjunction with or in lieu of door protector 300 according to one embodiment of the present disclosure.

Door protector 300 shown in FIG. 3 could be similar to door protector 104 shown in FIG. 1 and described in conjunction with the description accompanying FIG. 1 herein. It should be understood that door protector 300 could also be customized to any suitable shape, size, thickness, or configuration and include any embellishments as described above with door protector 104 in accordance with the present disclosure.

Additive 302 could be impregnated or dispersed in a layer, part of a layer, sub-layer, strip, a discrete portion of door protector 200, or entire thickness of door protector 200 to generally aid in securing door protector 200 to a door such as, for example, door 102 shown in FIG. 1. Additive 302 could include any desirable additive to help train a pet. For example, additive 302 could include any foul or unpleasant tasting or smelling material, or any material or combination of materials that pets generally find unpleasant to touch or scratch. In one embodiment, additive 302 could be a spray-on or otherwise reapplied if additive 302 wears off or otherwise diminishes in strength, quantity, quality, or overall effectiveness.

Additive 302 could include any suitable concentration of deterrent, natural or organic deterrent, repellent, scent, citrus scent, citronella, foul-smelling material, herbal mixture, botanical material, oil, mineral, lotion, cream, sprayable material, other suitable deterrent, or any combination thereof according to one embodiment of the present disclosure. In addition, additive 302 could include a treated surface, touch-sensitive scented material, scratchable material, scratch-resistant material, grooved surface, other suitable tactile material, or any combination thereof.

Figure 4:
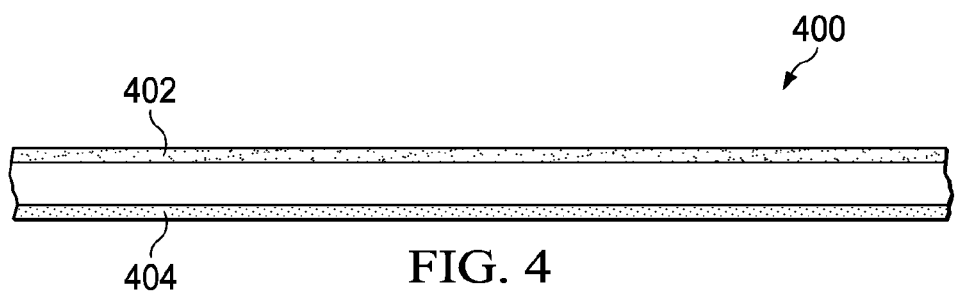
FIG. 4 is an exemplary cross-sectional view of a door protector having an adhesive and an additive according to one embodiment of the present disclosure.

FIG. 4 is an exemplary cross-sectional view of door protector 400 having adhesive 402 and additive 404 according to one embodiment of the present disclosure. It should be understood that door protector 400 shown in FIG. 4 is for illustrative purposes only and that any other suitable system or subsystem could be used in conjunction with or in lieu of door protector 400 according to one embodiment of the present disclosure.

Door protector 400 shown in FIG. 4 could be similar to door protector 104 shown in FIG. 1 and described in conjunction with the description accompanying FIG. 1 herein. It should be understood that door protector 400 could also be customized to any suitable shape, size, thickness, or configuration and include any embellishments as described above with door protector 104 in accordance with the present disclosure.

Adhesive 402 could be similar to adhesive 202 shown in FIG. 2 and described in conjunction with the description accompanying FIG. 2 herein. Likewise, additive 404 could be similar to additive 302 shown in FIG. 3 and described in conjunction with the description accompanying FIG. 3 herein.

Figure 5:
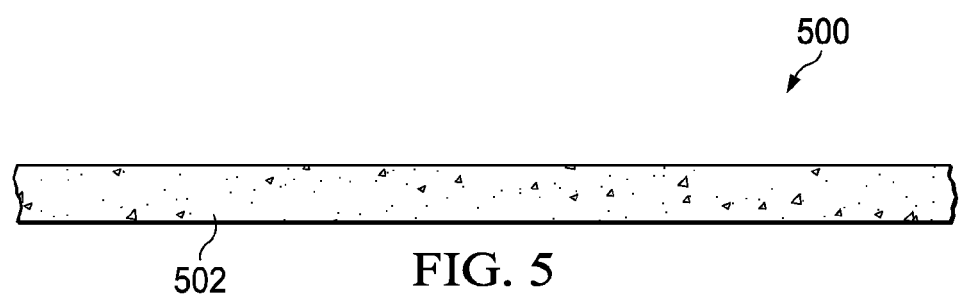
FIG. 5 is an exemplary cross-sectional view of a door protector having an additive dispersed throughout the thickness of the door protector according to one embodiment of the present disclosure.

FIG. 5 is an exemplary cross-sectional view of door protector 500 having additive 502 according to one embodiment of the present disclosure. It should be understood that door protector 500 shown in FIG. 5 is for illustrative purposes only and that any other suitable system or subsystem could be used in conjunction with or in lieu of door protector 500 according to one embodiment of the present disclosure.

Door protector 500 shown in FIG. 5 could be similar to door protector 104 shown in FIG. 1 and described in conjunction with the description accompanying FIG. 1 herein. It should be understood that door protector 500 could also be customized to any suitable shape, size, thickness, or configuration and include any embellishments as described above with door protector 104 in accordance with the present disclosure.

Additive 502 could be generally dispersed through the thickness of door protector 500 and could be similar to additive 302 shown in FIG. 3 and described in conjunction with the description accompanying FIG. 3 herein.

Figure 6:
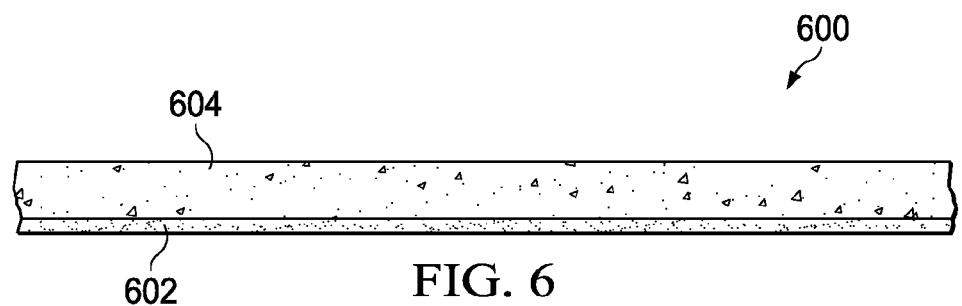
FIG. 6 is an exemplary cross-sectional view of a door protector having an adhesive and an additive dispersed throughout the thickness of the door protector according to one embodiment of the present disclosure.

FIG. 6 is an exemplary cross-sectional view of door protector 600 having adhesive 602 and additive 604 according to one embodiment of the present disclosure. It should be understood that door protector 600 shown in FIG. 6 is for illustrative purposes only and that any other suitable system or subsystem could be used in conjunction with or in lieu of door protector 600 according to one embodiment of the present disclosure.

Door protector 600 shown in FIG. 6 could be similar to door protector 104 shown in FIG. 1 and described in conjunction with the description accompanying FIG. 1 herein. It should be understood that door protector 600 could also be customized to any suitable shape, size, thickness, or configuration and include any embellishments as described above with door protector 104 in accordance with the present disclosure.

Adhesive 602 could be similar to adhesive 202 shown in FIG. 2 and described in conjunction with the description accompanying FIG. 2 herein. Likewise, additive 604 could be similar to additive 302 shown in FIG. 3 and described in conjunction with the description accompanying FIG. 3 herein.

Figure 7:
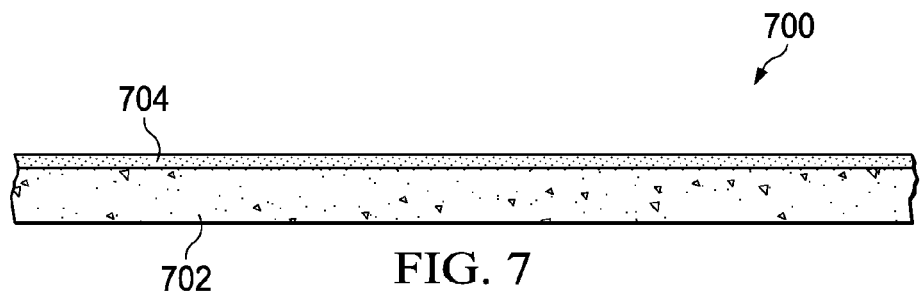
FIG. 7 is an exemplary cross-sectional view of a door protector having an additive dispersed throughout the thickness of the door protector and an additive layer disposed on a surface of the door protector according to one embodiment of the present disclosure.

FIG. 7 is an exemplary cross-sectional view of door protector 700 having additive 702 and additive 704 according to one embodiment of the present disclosure. It should be understood that door protector 700 shown in FIG. 7 is for illustrative purposes only and that any other suitable system or subsystem could be used in conjunction with or in lieu of door protector 700 according to one embodiment of the present disclosure.

Door protector 700 shown in FIG. 7 could be similar to door protector 104 shown in FIG. 1 and described in conjunction with the description accompanying FIG. 1 herein. It should be understood that door protector 700 could also be customized to any suitable shape, size, thickness, or configuration and include any embellishments as described above with door protector 104 in accordance with the present disclosure.

Additive 702 and additive 704 could be similar to additive 302 shown in FIG. 3 and described in conjunction with the description accompanying FIG. 3 herein. In one embodiment, additive 702 could be generally dispersed through the thickness of door protector 500, while additive 704 could be generally disposed in a layer-like fashion over a surface of door protector 500.

Figure 8:
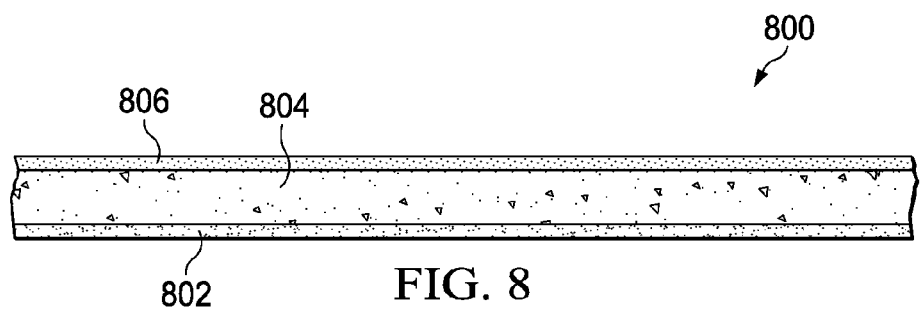
FIG. 8 is an exemplary cross-sectional view of a door protector having an adhesive, an additive dispersed throughout the thickness of the door protector, and an additive layer disposed on a surface of the door protector according to one embodiment of the present disclosure.

FIG. 8 is an exemplary cross-sectional view of door protector 800 having adhesive 802, additive 804, and additive 806 according to one embodiment of the present disclosure. It should be understood that door protector 800 shown in FIG. 8 is for illustrative purposes only and that any other suitable system or subsystem could be used in conjunction with or in lieu of door protector 800 according to one embodiment of the present disclosure.

Door protector 800 shown in FIG. 8 could be similar to door protector 104 shown in FIG. 1 and described in conjunction with the description accompanying FIG. 1 herein. It should be understood that door protector 800 could also be customized to any suitable shape, size, thickness, or configuration and include any embellishments as described above with door protector 104 in accordance with the present disclosure.

Adhesive 802 could be similar to adhesive 202 shown in FIG. 2 and described in conjunction with the description accompanying FIG. 2 herein. Additive 804 and additive 806 could be similar to additive 302 shown in FIG. 3 and described in conjunction with the description accompanying FIG. 3 herein. In one embodiment, additive 804 could be generally dispersed through the thickness of door protector 800, while additive 806 could be generally disposed in a layer-like fashion over a surface of door protector 800.

Figure 9:
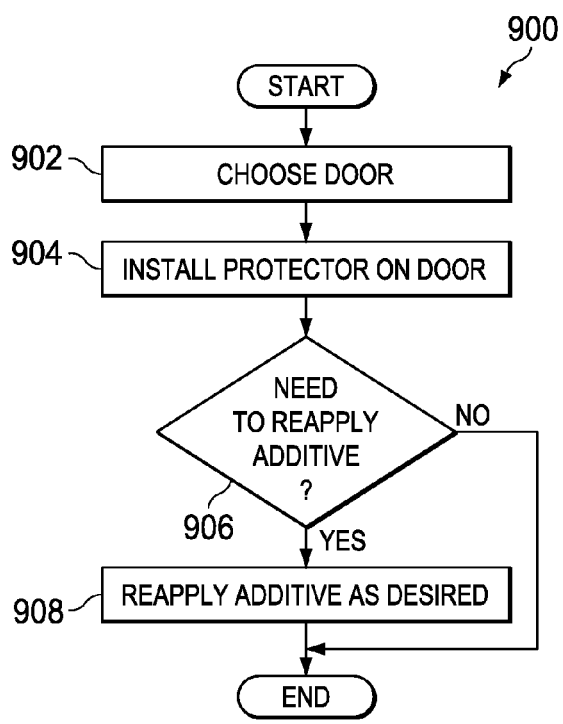
FIG. 9 is a somewhat simplified flow diagram illustrating a method of using a canine behavioral modification system according to one embodiment of the present disclosure.

FIG. 9 is a somewhat simplified flow diagram illustrating method 900 of using a behavioral modification system according to one embodiment of the present disclosure. It should be understood that method 900 shown in FIG. 9 is for illustrative purposes only and that any other suitable method or sub-method could be used in conjunction with or in lieu of method 900 according to one embodiment of the present disclosure. It should also be understood that the steps of method 900 could be performed in any suitable order or manner.

In one embodiment, step 902 could include a user of a pet behavioral modification system such as, for example, system 100 shown in FIG. 1, choosing a door such as, for example, door 102 also shown in FIG. 1, to implement system 100.

After choosing door 102, a door protector such as, for example, door protector 104 shown in FIG. 1, could be installed on door 102 in step 904. The installation could depend on the type of adhesive used with door protector 104. For example, the adhesive used in step 904 could include adhesive 202 shown in FIG. 2 and described in the description accompanying FIG. 2 herein.

In step 906, the user ascertains whether an additive associated with door protector 104 needs replenishing or reapplication. If the amount of additive such as, for example, additive 302 shown in FIG. 3 and described in the description accompanying FIG. 3 herein, is inadequate, the user could reapply additive 302 in step 908. For example, additive 302 could be sprayed on a surface of door protector 104 to increase the strength or effectiveness of additive 302. Otherwise, if the user ascertains that no additional additives are required in step 906, then method 900 ends.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure and the following claims.

What is claimed is:

1. A pet behavior modification system comprising:
   a covering having an adhesive coupling the covering to a surface, wherein the surface comprises a door; and
   an additive dispersed through a layer forming the covering, the additive having a deterrent effect on a pet that cannot be activated unless the layer of the covering is scratched or touched by the pet.

2. The system of claim 1, wherein the deterrent effect comprises a scent.

3. The system of claim 1, wherein the additive is reapplicable to the covering should the deterrent effect diminish in strength.

4. The system of claim 1, wherein the additive is disposed throughout the thickness of the covering.

5. The system of claim 1, wherein the adhesive is disposed along at least a portion of one side of the covering.

6. The system of claim 1, wherein the adhesive provides a temporary coupling between the covering and the surface.

7. The system of claim 1 wherein the layer is polyvinyl chloride (PVC).

8. A pet behavior modification system comprising:
   a covering having an adhesive removably coupling the covering to a surface of a door; and
   an additive dispersed through a layer forming the covering and having a deterrent effect to a pet, wherein the deterrent effect is not activated until the layer of the covering is scratched or touched by the pet.

9. The system of claim 8, wherein the deterrent effect comprises a scent.

10. The system of claim 8, wherein the additive is reapplicable to the covering should the deterrent effect diminish in strength.

11. The system of claim 8, wherein the additive is disposed throughout the thickness of the covering.

12. The system of claim 8 wherein the layer is polyvinyl chloride (PVC).

13. A pet behavior modification system comprising:
    a covering formed of polyvinyl chloride (PVC) having an adhesive coupling the covering to a surface of a door; and
    an additive dispersed through the PVC, wherein the additive releases a scent having a deterrent effect to the pet when the PVC is scratched or touched by the pet.

14. The system of claim 13, wherein the additive is reapplicable to the covering should the scent diminish in strength.

15. The system of claim 13, wherein the additive is disposed throughout the thickness of the covering.

16. The system of claim 13, wherein the adhesive removably couples the covering and the surface.

* * * * *